US011550949B2

(12) United States Patent
Vandanapu (10) Patent No.: US 11,550,949 B2
(45) Date of Patent: Jan. 10, 2023

(54) SECURE EXCHANGE OF PASSWORD PRESENCE DATA (71) Applicant: 4IQ, Inc., Los Altos, CA (US)

(72) Inventor: Pulleswararao Naga Vandanapu, Redwood City, CA (US)

(73) Assignee: Constella Intelligence, Inc., Los Altos, CA (US)

( * ) Notice: Subject to any disclaimer, the term of this patent is extended or adjusted under 35 U.S.C. 154(b) by 146 days.

(21) Appl. No.: 16/934,409

(22) Filed: Jul. 21, 2020

(65) Prior Publication Data

US 2022/0027498 A1    Jan. 27, 2022

(51) Int. Cl.
*G06F 21/62*    (2013.01)
*G06F 21/31*    (2013.01)
(Continued)

(52) U.S. Cl.
CPC .......... *G06F 21/6245* (2013.01); *G06F 21/31* (2013.01); *G06F 21/602* (2013.01);
(Continued)

(58) Field of Classification Search
CPC .... G06F 21/6245; G06F 21/31; G06F 21/602; G06F 21/6227; G06F 21/6272; G06F 21/45; G06K 9/6256; H04L 9/0643
See application file for complete search history.

(56) References Cited

U.S. PATENT DOCUMENTS 7,610,627 B1 * 10/2009 McKenna ............... G06F 21/62
713/168

8,490,162 B1 * 7/2013 Popoveniuc ........ H04L 63/1433
726/19
(Continued)

FOREIGN PATENT DOCUMENTS

CN    106453393 A  *  2/2017   ......... H04L 63/0428
CN    108632248 A  *  10/2018  ......... G06F 21/6227
(Continued)

OTHER PUBLICATIONS

Thomas et al., "Protecting Accounts from Credential Stuffing with Password Breach Alerting", Proceedings of the 28th USENIX Security Symposium, URL:http://www.usenix.org/system/files/sec 19-thomas.pdf, dated 2019, 18 pages.
(Continued)

*Primary Examiner* — Shahriar Zarrineh
(74) *Attorney, Agent, or Firm* — Hickman Becker Bingham Ledesma LLP (57) ABSTRACT

A computer-implemented method comprises, storing user identity records in digital data repositories relating to user identity information collected from a plurality of sources, receiving a request specifying a partial hash of particular user identity information, generating and submitting a query to the digital data repositories to retrieve a set of user identity records that match the partial hash, generating and storing a bloom filter based on the plurality of user credential values associated with the particular user identity information, the bloom filter being configured to allow a client computing device to determine whether a particular user credential value that is associated with the particular user identity information is included in the plurality of user credentials represented by the bloom filter, transmitting the bloom filter to the client computing device.

16 Claims, 5 Drawing Sheets

(51) Int. Cl.
   *G06F 21/60*    (2013.01)
   *G06K 9/62*     (2022.01)
   *H04L 9/06*     (2006.01)

(52) U.S. Cl.
   CPC ....... *G06F 21/6227* (2013.01); *G06K 9/6256* (2013.01); *H04L 9/0643* (2013.01)

(56) References Cited

U.S. PATENT DOCUMENTS

| | | | | |
|---|---|---|---|---|
| 8,499,355 | B1* | 7/2013 | Goncharov | H04L 63/1441 |
| | | | | 726/25 |
| 8,640,231 | B2* | 1/2014 | Florencio | H04L 63/1483 |
| | | | | 705/14.1 |
| 8,825,678 | B2* | 9/2014 | Potapov | G06F 3/0611 |
| | | | | 707/754 |
| 8,832,804 | B1* | 9/2014 | Casey | G06F 21/31 |
| | | | | 704/275 |
| 8,966,252 | B2* | 2/2015 | Mutka | H04L 63/083 |
| | | | | 713/168 |
| 9,967,236 | B1* | 5/2018 | Ashley | H04L 63/20 |
| 10,051,001 | B1* | 8/2018 | Ashley | H04L 63/1433 |
| 10,102,265 | B1* | 10/2018 | Madisetti | G06F 16/1805 |
| 10,498,542 | B2* | 12/2019 | Ebrahimi | H04L 9/3297 |
| 10,635,824 | B1* | 4/2020 | Triandopoulos | G06F 21/602 |
| 10,642,994 | B1* | 5/2020 | Allen | H04L 63/0428 |
| 10,650,003 | B1* | 5/2020 | Rubin | G06F 16/24573 |
| 10,970,393 | B1* | 4/2021 | Stiles | G06F 21/554 |
| 11,223,636 | B1* | 1/2022 | Angara | H04L 9/3247 |
| 2007/0199054 | A1* | 8/2007 | Florencio | H04L 63/1483 |
| | | | | 726/5 |
| 2013/0305039 | A1* | 11/2013 | Gauda | G06F 21/6272 |
| | | | | 713/153 |
| 2016/0197937 | A1* | 7/2016 | Roth | H04L 63/0838 |
| | | | | 713/193 |
| 2018/0248686 | A1* | 8/2018 | Alakuijala | H04L 9/0643 |
| 2018/0332079 | A1 | 11/2018 | Ashley | |
| 2018/0357434 | A1* | 12/2018 | Roy | G06F 21/6209 |
| 2019/0007428 | A1* | 1/2019 | Moen | H04L 67/02 |
| 2019/0236267 | A1* | 8/2019 | Sanders | H04L 9/0894 |
| 2020/0137038 | A1* | 4/2020 | Endler | H04L 63/1433 |
| 2020/0137105 | A1* | 4/2020 | Endler | G06F 21/45 |
| 2020/0279041 | A1* | 9/2020 | Endler | G06F 21/45 |
| 2020/0279050 | A1* | 9/2020 | Endler | G06F 16/144 |
| 2022/0191164 | A1* | 6/2022 | Stolbikov | H04L 61/4511 |

FOREIGN PATENT DOCUMENTS

| | | | | | |
|---|---|---|---|---|---|
| CN | 114175568 | A | * | 3/2022 | H04L 9/008 |
| GB | 2532988 | A | * | 6/2016 | G06F 16/24534 |
| GB | 2587000 | A | * | 3/2021 | G06F 21/46 |
| KR | 101476039 | B1 | * | 12/2014 | |
| KR | 101742523 | B1 | * | 6/2017 | |
| TW | I716016 | B | * | 1/2021 | |
| WO | WO-2019096422 | A1 | * | 5/2019 | H04L 12/5692 |
| WO | WO 2020/163087 | | | 8/2020 | |
| WO | WO-2020186081 | A1 | * | 9/2020 | G06F 3/0604 |

OTHER PUBLICATIONS

The International Searching Authority, "Search Report" in Application No. PCT/US2021/041875, dated Oct. 29, 2021, 17 pages.
Li et al., "Protocols for Checking Compromised Credentials", ACM SIGSAC Conference on Computer and Communications Security, https://doi.org/10.1145/3319535.3354229, dated 2019, 18 pages.

* cited by examiner

Storing a plurality of user identity records relating to user identity information and user credentials collected from a plurality of sources in one or more digital data repositories, the plurality of user identity records comprising unhashed user identity records and hashed user identity records, each of the hashed user identity records corresponding to one of the unhashed user identity records
202

Receive a request from a client computing device, the request specifying a partial hash of particular user identity information
204

Generate and submit a query to the one or more digital data repositories based on the partial hash, the query programmed to retrieve a set of user identity records of the plurality of user identity records that match the partial hash, the set of user identity records comprising a plurality of user credential values that is associated with the partial hash of the particular user identity information
206

Generate and store a bloom filter based on the plurality of user credential values associated with the particular user identity information, the bloom filter configured to allow the client computing device to determine whether a particular user credential value that is associated with the particular user identity information is included in the plurality of user credentials represented by the bloom filter
208

Transmit the bloom filter to the client computing device
210

SECURE EXCHANGE OF PASSWORD PRESENCE DATA

FIELD OF THE DISCLOSURE

One technical field of the present disclosure is computer-implemented secure data retrieval and transmission. Yet another technical field is computer-implemented bloom filters.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

As a result of cyber-attacks and data breaches, hacked, dumped, lost, leaked and otherwise compromised identity information is proliferated throughout the world wide web. "Dark web" sites host files that contain thousands to millions of usernames and passwords, for example. To keep track of compromised identity information, various techniques such as auto-crawling, scraping, and manual monitoring can be used to retrieve and store an amalgamation of compromised data from a variety of sources. For example, hackers often publish data to various sources that contains thousands of compromised usernames and passwords. Such data can be retrieved, normalized, and stored in a searchable database.

In many cases, entities or individuals may never know that their personal identity information has been compromised. Thus, keeping an updated database of compromised identity information can potentially be valuable to help entities or individuals understand what data has been breached or leaked.

However, when accessing such a database, a query for a username or password may reveal identity information about who or what the party that is issuing the query is searching for and may require the party to comply with various data privacy regulations. Additionally, from the perspective of the database, any sharing of such personal identity information, such as in response to a query, may further expose personal identity information to malicious actors and also require a party that manages the database to comply with various data privacy regulations.

Thus, computer-implemented techniques are desired to facilitate a secure exchange of sensitive data between computerized devices and to reduce the attack surface area of a software environment that facilitates an exchange of sensitive data.

SUMMARY

The appended claims may serve as a summary of the invention.

DESCRIPTION OF EXAMPLE EMBODIMENTS

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form to avoid unnecessarily obscuring the present invention. Embodiments are described in sections according to the following outline:

1. OVERVIEW
2. EXAMPLE SYSTEM IMPLEMENTATION
3. EXAMPLE FUNCTIONAL IMPLEMENTATION
4. EXAMPLE IMPLEMENTATION
5. IMPLEMENTATION EXAMPLE—HARDWARE OVERVIEW
6. OTHER ASPECTS OF DISCLOSURE

1. Overview

Systems and methods are provided for a secure exchange of password presence data. User identity information and user credentials are collected from a plurality of sources and stored in a searchable database as user identity records. The database represents a collection user identity records that have been compromised. In other words, each user identity record stored in the database represents data that has been hacked, dumped, lost, breached, leaked or otherwise compromised. Each user identity record is stored as a hashed user identity record and a corresponding unhashed user identity record.

A client computing device generates a request to search for a particular user identity record in the database. The request comprises a partial hash of user identity information. For example, a client computing device may first generate a full hash of the username: "User1234" represented by the character string: "180906e54fa0115f6aea04fdc51f3287dc6e3db586a". A subset of characters from the full hash may be used to generate a partial hash, such as the first eight characters of the full hash: "180906e5". The request is transmitted to a server computer device for further processing.

The server computing device receives the request and translates the request into a query. The query is programmed to retrieve user identity records that match the partial hash. When executed, the query retrieves all user identity records from the database that match the partial hash. For example, the partial hash "180906e5" is queried against the database to identity all hashed user identity records that match partial hash "180906e5".

Because the database stores user identity records in both hashed and unhashed form, the partial hash specified in the request can be queried against the hashed user identity records. When one or more matches are found between the partial hash specified in the request and one or more hashed user identity records, the corresponding unhashed user identity records are returned as a result of the query.

The server computing device generates a bloom filter based on user credential values from the user identity records that match the partial hash. The bloom filter comprises a bitset that is configured to allow a client computing device to determine whether a user credential value that is associated with the particular user identity information is included in the user credentials that are represented by the bloom filter. For example, using one or more hash functions that are used to generate the bloom filter, a client computing device can determine if a password associated with "User1234" such as "password1234" is included in the bloom filter. If it is determined that a user credential associated with the particular user identity record is included in the bloom filter, actions such generating an alert that indicates that the particular user identity record has been compromised and/or executing programmatic instructions to restrict access to a user account associated with the particular user identity record can be executed.

Techniques discussed herein provide a secure exchange of information that can be used to determine whether user identity information has been compromised. For example, by generating a request comprising a partial hash of user identity information that is to be searched against a database, any malicious actor that intercepts the request will be unaware of the core data that the partial hash represents. Additionally, by hashing a database of user identity records and using partial hashes to search the database, exposure of sensitive user information during a querying operation is further reduced. Further, by encoding user credential information such as one or more passwords that result from the query into a bloom filter, a client device cannot access the actual passwords encoded by the bloom filter, but can only can check if a particular password is included in the bloom filter, further reducing the exposure of sensitive data during an information exchange between client and server devices. Thus, techniques discussed herein provide a combination of multiple layers of security that effectively reduce sensitive data exposure and attack surface area to malicious actors.

It will be apparent that the techniques of this disclosure provide numerous benefits including reducing the use of computer CPU cycles, storage, memory and network bandwidth that otherwise would be used to execute a query for sensitive information and share result information over a network with client devices. As one specific example, by hashing a database of compromised user identity records and searching the database using partial hashes, the database can quickly be searched using simple character comparisons and the result data can be securely transmitted and accessed using a bloom filter. There is no need for resource intensive encryption techniques. Instead, techniques discussed herein conserve computing resources required to query for and share sensitive data with client devices while reducing the exposure of surface attack area of the sensitive data.

2. Example Computer System Implementation

Figure 1:
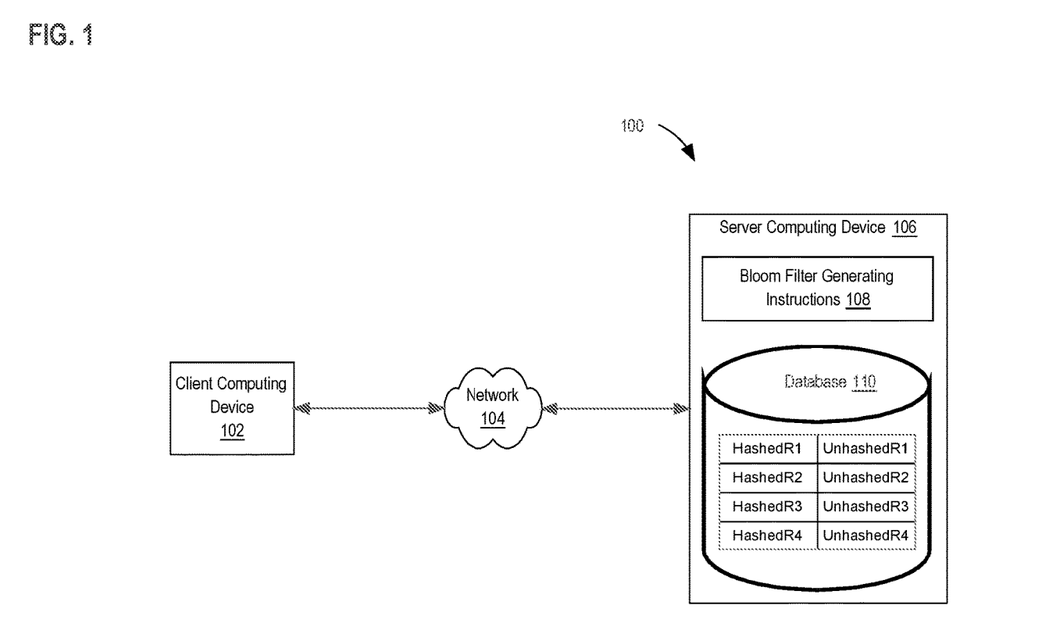
FIG. 1 illustrates an example computer system, according to an embodiment.

FIG. 1 illustrates an example networked computer system with which various implementations may be practiced. FIG. 1, and the other drawing figures and all of the description and claims in this disclosure, are intended to present, disclose and claim a technical system and technical methods in which specially programmed computers, using a special-purpose distributed computer system design, execute functions that have not been available before to provide a practical application of computing technology to the problem of how to accomplish contactless delivery of tangible goods to a party with automatic detection of the arrival of the party and automatic determination of the correct order or goods without communication initiated by the receiving party. In this manner, the disclosure presents a technical solution to a technical problem, and any interpretation of the disclosure or claims to cover any judicial exception to patent eligibility, such as an abstract idea, mental process, method of organizing human activity or mathematical algorithm, has no support in this disclosure and is erroneous.

FIG. 1 is shown in simplified, schematic format for purposes of illustrating a clear example and other implementations may include more, fewer, or different elements. System 100 comprises various entities and devices which may be used to practice an implementation. Network 104 is a network entity which facilitates communication between entities depicted in FIG. 1. Connection to network 104 is show by double-sided arrows between a connecting entity and network 104. Network 104 may be any electronic communication medium or hub which facilitates communications between two or more entities, including but not limited to an internet, an intranet, a local area connection, a cloud-based connection, a wireless connection, a radio connection, a physical electronic bus, or any other medium over which digital and electronic information may be sent and received.

Server computing device 106 is connected to network 104 and is an entity which facilitates a secure exchange of password presence data between user computing device 102 and server computing 106. Server computing device 106 may be any hardware, software, virtual machine, or general-purpose entity capable of performing the processes discussed herein. In various implementations, the server computing device 106 executes bloom filter generating instructions 108, the functions of which are described in other sections herein. The server computer system 106 may also execute additional code, such as code for receiving requests from client computing device 102 and code for querying data from database 110.

Database 110 may be any number of individual or linked storage devices or mediums which allow the storage of digital data, as discussed herein. Database 110 may further include one or more database management systems (DBMS) for accessing, retrieving, storing, and/or manipulating data stored in database 110. The DBMS may use any of a variety of database models (e.g., relational model, object model, etc.) and may support any of a variety of query languages. In one embodiment, database 110 stores user identity records. Each user identity record includes user identity information and user credentials that are collected from a plurality of sources. Each user identity record stored in database 110 comprises an unhashed user identity record and a corresponding hashed user identity record. For example, database 110 includes a table that includes a plurality of user identity records. As shown in FIG. 1, the table includes "HashedR1" indicating a hashed user identity record and "UnhashedR1" indicating an unhashed user identity record that corresponds to "HashedR1". The table also includes "HashedR2" indicating a hashed user identity record and "UnhashedR2" indicating an unhashed user identity record that corresponds to "HashedR2", and so forth.

The bloom filter generating instructions 108 may be programmed or configured to generate and transmit bloom filters. For example, the bloom filter generating instructions 108 may generate blooms filters based on user identity records including credential values associated with user identity information. The bloom filter generating instructions 108 may transmit bloom filters to client computing device 102 along with bloom filter configuration information that indicates one or more hash functions that are used to generate the bloom filters. The bloom filter generating instructions 108 may also be used for implementing aspects of the flow diagrams that are further described herein.

Computer executable instructions described herein may be in machine executable code in the instruction set of a CPU and may have been compiled based upon source code written in JAVA, C, C++, OBJECTIVE-C, or any other human-readable programming language or environment, alone or in combination with scripts in JAVASCRIPT, other scripting languages and other programming source text. In another embodiment, the programmed instructions also may represent one or more files or projects of source code that are digitally stored in a mass storage device such as non-volatile RAM or disk storage, in the systems of FIG. 1 or a separate repository system, which when compiled or interpreted cause generating executable instructions which when executed cause the computer to perform the functions or operations that are described herein with reference to those instructions. In other words, the drawing figure may represent the manner in which programmers or software developers organize and arrange source code for later compilation into an executable, or interpretation into bytecode or the equivalent, for execution by the server computer system 112.

Client computing device 102 is a device/entity which allows a client to generate requests and queries, transmit requests and queries to server computing device 106, and receive responses to requests and queries from server computing device 106. Client computing device 102 may be any device, such as a mobile computing device, capable of connection to network 104 through any method described herein. Client computing device 102 may comprise various programs, modules, or software applications that may be used to generate requests, receive responses to requests, and execute programmatic functions in response to requests. The client computing device 102 may receive actions comprising instructions, requests, notifications, and/or recommendations to execute or display from server computer system 102.

Any of the components of the system 100 and associated architecture may include alternate and/or additional hardware, software, or firmware components beyond those described or depicted without departing from the scope of the disclosure. For example, hardware, software, or firmware components depicted or described as forming part of any of the illustrative components of the system 100, and the associated functionality that such components support, are merely illustrative and that some components may not be present or additional components may be provided in various embodiments. While various program modules have been depicted and described with respect to various illustrative components of the system 100, the functionality described as being supported by the program modules may be enabled by any combination of hardware, software, and/or firmware. Each of the above-mentioned modules may, in various embodiments, represent a logical partitioning of supported functionality. This logical partitioning is depicted for ease of explanation of the functionality and may not be representative of the structure of hardware, software, and/or firmware for implementing the functionality. The functionality described as being provided by a particular module may, in various embodiments, be provided at least in part by one or more other modules. Further, one or more depicted modules may not be present in certain embodiments, while in other embodiments, additional modules not depicted may be present and may support at least a portion of the described functionality and/or additional functionality. Further, while certain modules may be depicted and described as sub-modules of another module, in certain embodiments, such modules may be provided as independent modules.

The system 100 is one example only. Numerous other operating environments, system architectures, and device configurations are within the scope of this disclosure. Other embodiments of the disclosure may include fewer or greater numbers of components and/or devices and may incorporate some or all of the functionality described with respect to the illustrative system 100, or additional functionality.

3. Example Functional Implementation

Figure 2:
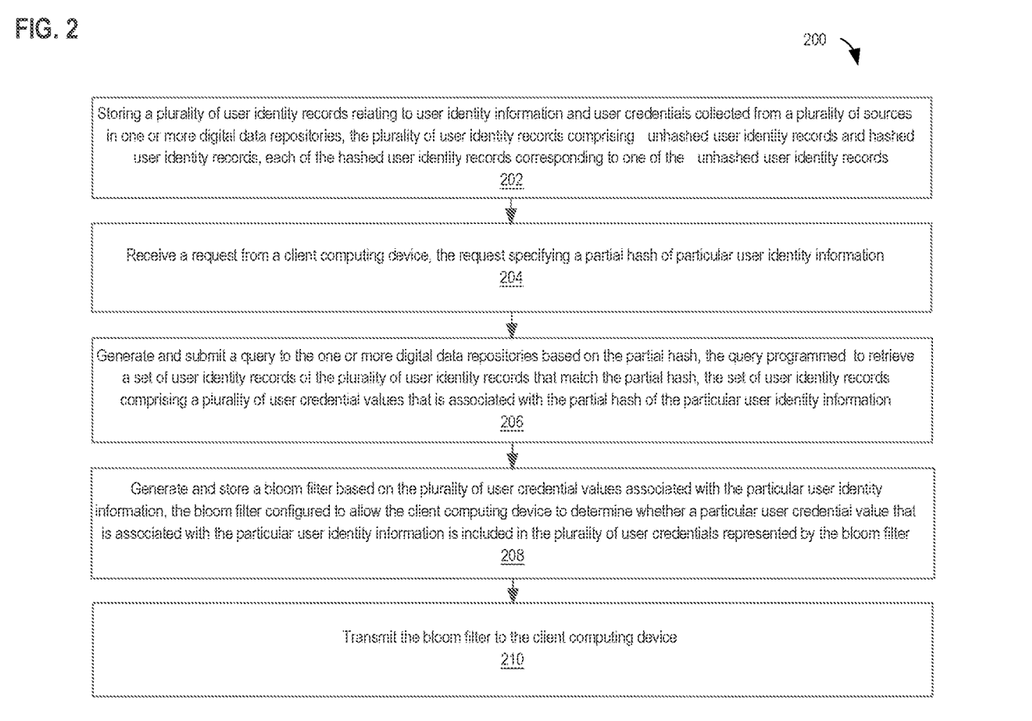
FIG. 2 illustrates an example flowchart of a method for a secure exchange of password presence data, according to an embodiment.

FIG. 2 shows an example flowchart of a method for a secure exchange of password presence data, according to an embodiment.

Although the steps in FIG. 2 are shown in one example order, the steps of FIG. 2 may be performed in any order and are not limited to the order shown in FIG. 2. Additionally, some steps may be optional, may be performed multiple times, or may be performed by different components. All steps, operations, and functions of a flow diagram that are described herein are intended to indicate operations that are performed using programming in a special-purpose computer or general-purpose computer, in various embodiments. Each flow diagram and block diagram is presented at the same level of detail that persons skilled in the applicable technical fields use to communicate with one another about plans, specifications, algorithms, and data structures as a basis for programming implementations to solve the applicable technical problems, while also applying their accumulated knowledge and skill of computer architecture, programming, and engineering techniques. Each flow diagram in this disclosure provides a guide, plan, or specification of an algorithm for programming a computer to execute the functions that are described.

In step 202, using a first computer, a plurality of user identity records relating to user identity information and user credentials collected from a plurality of sources is stored in one or more digital data repositories. The plurality of user identity records comprises unhashed user identity records and hashed user identity records. Each of the hashed user identity records corresponds to one of the unhashed user identity records. For example, server computing device 106 collects a plurality of user identity records and stores them in database 110. For each user identity record, a hashed user identity record and an unhashed user identity record is stored in database 110. The unhashed user identity record may comprise a plain-text representation of the respective user identity record. The hashed user identity record may comprise a hashed representation of the respective user identity record. Any applicable hash function may be used to generate a hashed user identity record. An example hash algorithm that may be used in SHA-256.

In step 204, a request is received from a client computing device. The request specifies a partial hash of particular user identity information. For example, client computing device 102 generates a full hash of particular user identity information. User identity information may comprise a username or email address or any identification value that identifies a user. Any applicable hash function may be used to generate a full hash of the particular user identity information. An example hash algorithm that may be used in SHA-256. Based on the full hash of the particular user identity information, client computing device 102 generates a partial hash of the particular user identity information.

In one embodiment, the partial hash of the particular user identity information comprises a subset of characters of a full hash of the user identity information. For example, the partial hash of the particular user identity information may comprise the first eight characters of the full SHA-256 hash of the particular user identity information.

In one embodiment, the request may include metadata associated with the partial hash. The metadata may specify a salt and a hash function used to generate the partial hash.

In step 206, a query is generated a submitted to the one or more digital data repositories based on the partial hash. The query is programmed to retrieve a set of user identity records of the plurality of user identity records that match the partial hash. The set of user identity records comprises a plurality of user credential values that is associated with the partial hash of the particular user identity information. For example, server computing device 106 generates and submits a query to datastore 110 based on the partial hash. The query retrieves, from database 110, all user identity records that match the partial hash. Identifying a match may comprise first identifying a set of hashed user identity records that match the partial hash. Based on the set of hash user identity records, a corresponding set of unhashed user identity records is identified.

As discussed above, the matching set of user identity records comprises a plurality of user credential values that is associated with the partial hash of the particular user identity information. In one embodiment, the plurality of user credential values comprises a plurality of passwords. In one example, because the partial hash is generated based on a username or email address, the plurality of user credential values represents a plurality of passwords that are associated with the username or the email address represented by the partial hash.

In step 208, a bloom filter is generated and stored in computer memory based on the plurality of user credential values associated with the particular user identity information. The bloom filter comprises a bitset that is configured to allow a client computing device to determine whether a particular user credential value that is associated with the particular user identity information is included in the plurality of user credentials represented by the bloom filter. For example, server computing device 106 generates a bloom filter based on the plurality of user credential values associated with the particular user identity information. Server computing device 106 generates the bloom filter based on bloom filter configuration information comprising one or more hash functions that are used to generate the bloom filter, as described below.

In one embodiment, a bloom filter is a probabilistic data structure, such as a bitset, that indicates whether it is possible for a particular item to be included in a particular set. In other words, a bloom filter may provide false positives, because there is some uncertainty as to whether the particular item is included in the particular set. On the other hand, a bloom filter indicates, with absolute certainty, that a particular item is excluded from the particular set. In other words, a bloom filter never provides false negatives.

Figure 3:
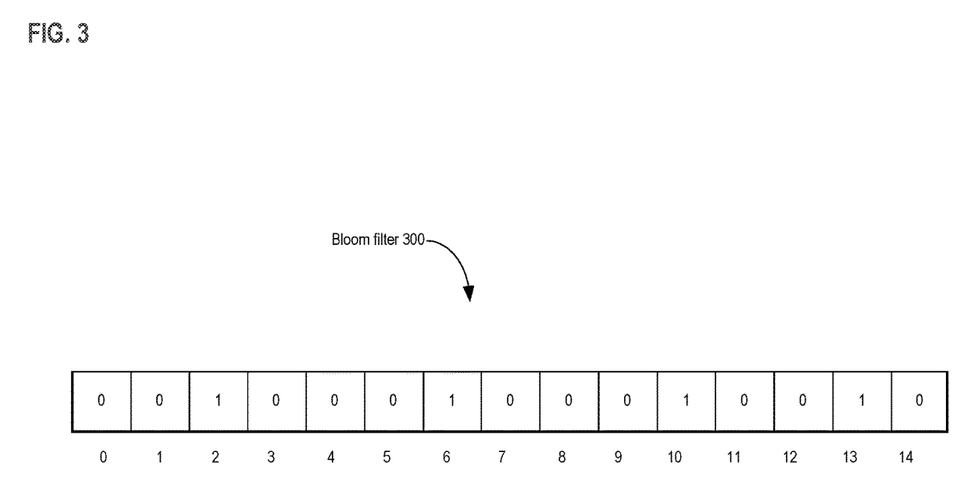
FIG. 3 illustrates an example bloom filter, according to an embodiment.

FIG. 3 illustrates an example bloom filter. For example, the set bits of bloom filter 300 indicate that a particular item corresponding to indices "2", "6", "10", and/or "13" could be included in a particular set represented by bloom filter 300. In contrast, the unset bits of bloom filter 300 indicate that it is impossible for a particular item corresponding to any other indices to be included in the particular set.

Elements are related to indices based on one or more hash functions. A hash function takes an item identifier as input and provides a corresponding index as output. Using more hash functions has the benefit of fewer false positives. However, it also has the drawbacks of filling up a bloom filter more quickly and making it slower to use the bloom filter. In one embodiment, two hash functions are used to generate a bloom filter.

For example, bloom filter 300 may be generated using two hash functions—hash function A and hash function B. The two hash functions may be used to "add" a particular item to bloom filter 300 based on providing the indices where bits should be set. In other words, adding a particular item to a bloom filter involves setting a bit at each index corresponding to the particular item. To illustrate, hash function A may take the item "password1234" and output the index "2", and hash function B may take the same item and output the index "13". The bits of bloom filter 300 corresponding to indices "2" and "13" are then set.

The one or more hash functions are also used to test for set membership. For example, hash function A may take the item "passwordABCD" and output the index "13", and hash function B may take the same item and output the index "2". Since bloom filter 300 has bits set at indices "2" and "13", bloom filter 300 indicate that it is possible that the item "passwordABCD" has been added to the bloom filter.

The one or more hash functions may also be used to test for items that have not been added to a bloom filter. For example, hash function A may take the item "passwordQWER" and output the index "0", and hash function B may take the same item and output the index "9". Since bloom filter 300 has unset bits at indices "0" and "9", bloom filter 300 would indicate that it is impossible for the item "passwordQWER" to have been added to it.

In step 210, the bloom filter is transmitted to the client computing device. For example, server computing device 106, transmit the bloom filter to client computing device 102.

In one embodiment, bloom filter configuration information comprising one or more hash functions used to generate the bloom filter is transmitted to the client computing device.

When the bloom filter and bloom filter configuration information is received at the client computing device 102, client computing device 102 can use the bloom filter and bloom filter configuration information to determine whether any user credential values are included in the bloom filter. For example, the client computing device 102 can determine, using the bloom filter and bloom filter configuration information, whether the particular user credential value that is associated with the particular user identity information is included in the plurality of user credentials represented by the bloom filter.

In some embodiments, in response to the client computing device determining that the particular user credential value is included in the bloom filter, the client computing device executes programmatic instructions that cause one or more of: a restriction of an account associated with the particular user identity information, a locking of an account associated with the particular user identity information, a generation and transmission of an alert that indicates that the particular user identity information has been compromised, a generation of a prompt or recommendation for an account associated with the particular user identity information to change password, an automatic changing of a password of an account that is associated with the particular user identity information.

4. Example Implementation

Figure 4:
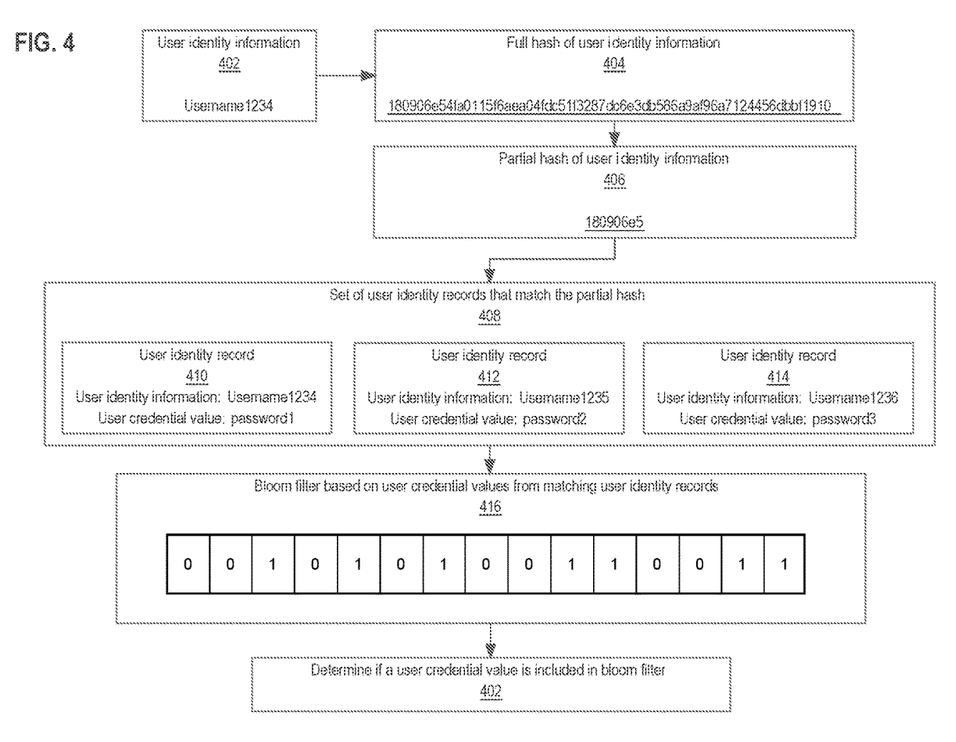
FIG. 4 illustrates an example of a secure exchange of password presence data, according to an embodiment.

FIG. 4 illustrates an example of a secure exchange of password presence data. FIG. 4 is discussed in context of FIG. 1 with reference to client computing device 102 and server computing device 106 performing various actions.

FIG. 4 shows user identity information 402 before it is hashed by a hash function. In this example, user identity information comprises a username: "Username1234" that identifies a user account. Client computing device 102 uses a hash function to generate a full hash of "Username1234", represented as the full hash of user identity information 402: "180906e54fa0115f6aea04fdc51f3287dc6e3db586a9af96a 7124456dbbf1910". Once the full hash of user identity information is generated, a partial hash of user identity information 206 is generated. In this example, the partial hash of user identity information 406 is generated by selecting the first eight characters from the full hash of user identity information 404 as the partial hash of user identity information: "180906e5". Once the partial hash of user identity information 406 is generated, client computing device 102 generates a request that includes the partial hash of user identity information 406 and transmits the request to server computer device 106.

Upon receiving the partial hash of user identity information 406, server computer device 106 generates and submits a query to database 110. The query is programmed to retrieve a set of user identity records that match the partial hash of user identity information 406. For example, the partial hash "180906e5" is queried against database 110 to identity all hashed user identity records that match partial hash "180906e5". Specifically, because database 110 stores user identity records in both hashed and unhashed form, the partial hash specified in the request from user computing device 102 can be queried against the hashed user identity records. When a match is found between the partial hash specified in the request and a hashed user identity record, the corresponding unhashed user identity record is returned as a result of the query. In one embodiment, matches may be identified between the partial hash and the hashed user identity information of user identity records stored in database 110.

The set of user identity records that match the partial hash 408 comprises a plurality of user identity records 410 412, 414. Only three user identity records are shown in FIG. 4 for brevity, but many more may form the result of the query. Each user identity record 410 412, 414 includes user identity information such as a username and a user credential value such as a password. It is important to note that because the partial hash of user identity information 402 is used as a basis for executing the query against hashed user identity records stored in database 110, some user identity records that match the partial hash 410, 412, 414, may not be exact matches of the original user identity information 402 "Username1234". For example, user identity record 412 includes user identity information: "Username1235", which may match the partial hash of "Username1234" but includes different characters than "Username1234".

When the results of the query are received, server computer device 106 generates a bloom filter based on the user credential values from the matching user identity records 416. The bloom filter 416 is generated using one or more hash functions to compute an index for each user credential value included in the set of user identity records that match the partial hash 408. The bloom filter 416 is configured to allow a client computing device to determine whether a particular user credential value that is associated with the particular user identity information is included in the plurality of user credentials represented by the bloom filter. Thus, the bloom filter 416 encodes all user credential values from the set of user identity records that match the partial hash, such as "password1" from user identity record 410, "password2" from user identity record 412, and "password3" from user identity record 412. Once the bloom filter 416 is created, the bloom filter 416 is transmitted to client computing device 102 along with bloom filter configuration information that specifies one or more hash functions that are used to generate the bloom filter.

When the client computing device 102 receives the bloom filter 416 and bloom filter configuration information, client computing device 102 can user the bloom filter 416 to determine if user credential information associated with user identity information 402 is included in the bloom filter. For example, client computing device 102 can use bloom filter 416 to determine if a password associated with "Username1234" from user identity information 402, such as "password1234" is included in the bloom filter 416.

As discussed above, because some user identity records that match the partial hash of user identity information 410, 412, 414, are not exact matches of the original user identity information 402 provided by the client computing device 102, the bloom filter 416 is necessary to prevent the sharing sensitive user credential values such as passwords and social security numbers. By using the bloom filter 416, client computing device 102 cannot view the actual passwords encoded by the bloom filter 416, but can check if a password is included in the bloom filter 416.

Techniques discussed herein provide a secure exchange of information that can be used to determine whether user identity information has been compromised. For example, by generating a request comprising a partial hash of user identity information that is to be searched against a database, any malicious actor that intercepts the request will be unaware of the core data that the partial hash represents. Additionally, by hashing a database of user identity records and using partial hashes to search the database, exposure of sensitive user information during a querying operation is further reduced. Further, by encoding user credential information such as one or more passwords that result from the query into a bloom filter, a client device cannot access the actual passwords encoded by the bloom filter, but can only can check if a particular password is included in the bloom filter, further reducing the exposure of sensitive data during an information exchange between client and server devices. Thus, techniques discussed herein provide a combination of multiple layers of security that effectively reduce sensitive data exposure and attack surface area to malicious actors.

It will be apparent that the techniques of this disclosure provide numerous benefits including reducing the use of computer CPU cycles, storage, memory and network bandwidth that otherwise would be used to execute a query for sensitive information and share result information over a network with client devices. As one specific example, by hashing a database of compromised user identity records and searching the database using partial hashes, the database can quickly be searched using simple character comparisons and the result data can be securely transmitted and accessed using a bloom filter. There is no need for resource intensive encryption techniques. Instead, techniques discussed herein conserve computing resources required to query for and share sensitive data with client devices while reducing the exposure of surface attack area of the sensitive data.

5. Implementation Example—Hardware Overview

According to one embodiment, the techniques described herein are implemented by at least one computing device. The techniques may be implemented in whole or in part using a combination of at least one server computer and/or other computing devices that are coupled using a network, such as a packet data network. The computing devices may be hard-wired to perform the techniques, or may include digital electronic devices such as at least one application-specific integrated circuit (ASIC) or field programmable gate array (FPGA) that is persistently programmed to perform the techniques, or may include at least one general purpose hardware processor programmed to perform the techniques pursuant to program instructions in firmware, memory, other storage, or a combination. Such computing devices may also combine custom hard-wired logic, ASICs, or FPGAs with custom programming to accomplish the described techniques. The computing devices may be server computers, workstations, personal computers, portable computer systems, handheld devices, mobile computing devices, wearable devices, body mounted or implantable devices, smartphones, smart appliances, internetworking devices, autonomous or semi-autonomous devices such as robots or unmanned ground or aerial vehicles, any other electronic device that incorporates hard-wired and/or program logic to implement the described techniques, one or more virtual computing machines or instances in a data center, and/or a network of server computers and/or personal computers.

Figure 5:
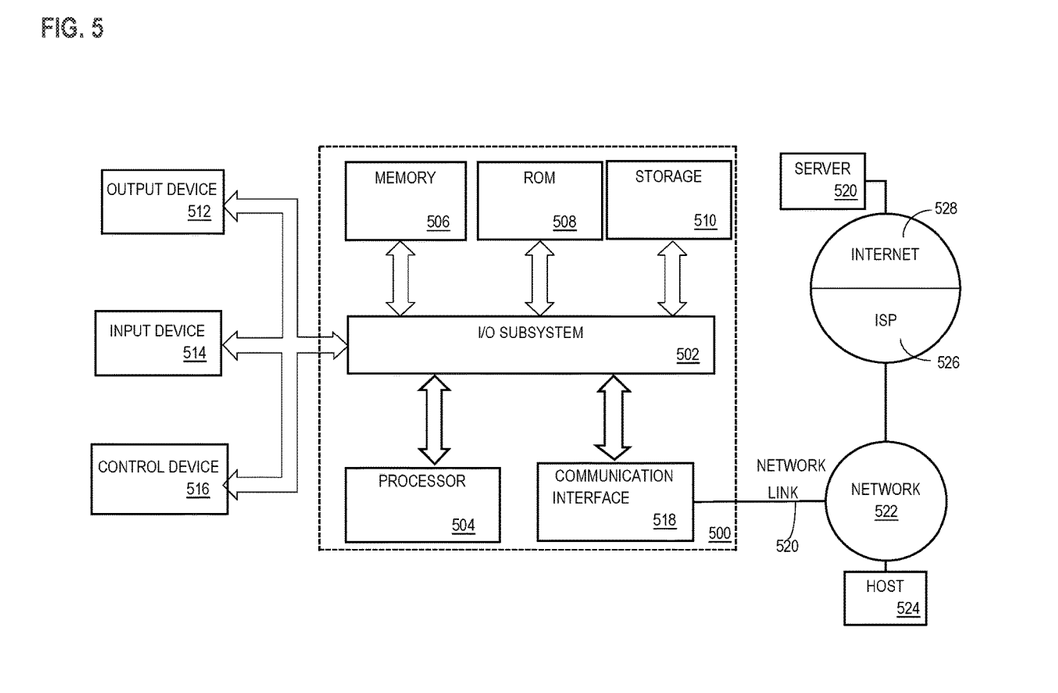
FIG. 5 illustrates an example computer system, according to an embodiment.

FIG. 5 is a block diagram that illustrates an example computer system with which an embodiment may be implemented. In the example of FIG. 5, a computer system 500 and instructions for implementing the disclosed technologies in hardware, software, or a combination of hardware and software, are represented schematically, for example as boxes and circles, at the same level of detail that is commonly used by persons of ordinary skill in the art to which this disclosure pertains for communicating about computer architecture and computer systems implementations.

Computer system 500 includes an input/output (I/O) subsystem 502 which may include a bus and/or other communication mechanism(s) for communicating information and/or instructions between the components of the computer system 500 over electronic signal paths. The I/O subsystem 502 may include an I/O controller, a memory controller and at least one I/O port. The electronic signal paths are represented schematically in the drawings, for example as lines, unidirectional arrows, or bidirectional arrows.

At least one hardware processor 504 is coupled to I/O subsystem 502 for processing information and instructions. Hardware processor 504 may include, for example, a general-purpose microprocessor or microcontroller and/or a special-purpose microprocessor such as an embedded system or a graphics processing unit (GPU) or a digital signal processor or ARM processor. Processor 504 may comprise an integrated arithmetic logic unit (ALU) or may be coupled to a separate ALU.

Computer system 500 includes one or more units of memory 506, such as a main memory, which is coupled to I/O subsystem 502 for electronically digitally storing data and instructions to be executed by processor 504. Memory 506 may include volatile memory such as various forms of random-access memory (RAM) or other dynamic storage device. Memory 506 also may be used for storing temporary variables or other intermediate information during execution of instructions to be executed by processor 504. Such instructions, when stored in non-transitory computer-readable storage media accessible to processor 504, can render computer system 500 into a special-purpose machine that is customized to perform the operations specified in the instructions.

Computer system 500 further includes non-volatile memory such as read only memory (ROM) 508 or other static storage device coupled to I/O subsystem 502 for storing information and instructions for processor 504. The ROM 508 may include various forms of programmable ROM (PROM) such as erasable PROM (EPROM) or electrically erasable PROM (EEPROM). A unit of persistent storage 510 may include various forms of non-volatile RAM (NVRAM), such as FLASH memory, or solid-state storage, magnetic disk or optical disk such as CD-ROM or DVD-ROM, and may be coupled to I/O subsystem 502 for storing information and instructions. Storage 510 is an example of a non-transitory computer-readable medium that may be used to store instructions and data which when executed by the processor 504 cause performing computer-implemented methods to execute the techniques herein.

The instructions in memory 506, ROM 508 or storage 510 may comprise one or more sets of instructions that are organized as modules, methods, objects, functions, routines, or calls. The instructions may be organized as one or more computer programs, operating system services, or application programs including mobile apps. The instructions may comprise an operating system and/or system software; one or more libraries to support multimedia, programming or other functions; data protocol instructions or stacks to implement TCP/IP, HTTP or other communication protocols; file format processing instructions to parse or render files coded using HTML, XML, JPEG, MPEG or PNG; user interface instructions to render or interpret commands for a graphical user interface (GUI), command-line interface or text user interface; application software such as an office suite, internet access applications, design and manufacturing applications, graphics applications, audio applications, software engineering applications, educational applications, games or miscellaneous applications. The instructions may implement a web server, web application server or web client. The instructions may be organized as a presentation layer, application layer and data storage layer such as a relational database system using structured query language (SQL) or no SQL, an object store, a graph database, a flat file system or other data storage.

Computer system 500 may be coupled via I/O subsystem 502 to at least one output device 512. In one embodiment, output device 512 is a digital computer display. Examples of a display that may be used in various embodiments include a touch screen display or a light-emitting diode (LED) display or a liquid crystal display (LCD) or an e-paper display. Computer system 500 may include other type(s) of output devices 512, alternatively or in addition to a display device. Examples of other output devices 512 include printers, ticket printers, plotters, projectors, sound cards or video cards, speakers, buzzers or piezoelectric devices or other audible devices, lamps or LED or LCD indicators, haptic devices, actuators or servos.

At least one input device 514 is coupled to I/O subsystem 502 for communicating signals, data, command selections or gestures to processor 504. Examples of input devices 514 include touch screens, microphones, still and video digital cameras, alphanumeric and other keys, keypads, keyboards, graphics tablets, image scanners, joysticks, clocks, switches, buttons, dials, slides, and/or various types of sensors such as force sensors, motion sensors, heat sensors, accelerometers, gyroscopes, and inertial measurement unit (IMU) sensors and/or various types of transceivers such as wireless, such as cellular or Wi-Fi, radio frequency (RF) or infrared (IR) transceivers and Global Positioning System (GPS) transceivers.

Another type of input device is a control device 516, which may perform cursor control or other automated control functions such as navigation in a graphical interface on a display screen, alternatively or in addition to input functions. Control device 516 may be a touchpad, a mouse, a trackball, or cursor direction keys for communicating direction information and command selections to processor 504 and for controlling cursor movement on display 512. The input device may have at least two degrees of freedom in two axes, a first axis (e.g., x) and a second axis (e.g., y), that allows the device to specify positions in a plane. Another type of input device is a wired, wireless, or optical control device such as a joystick, wand, console, steering wheel, pedal, gearshift mechanism or other type of control device. An input device 514 may include a combination of multiple different input devices, such as a video camera and a depth sensor.

In another embodiment, computer system 500 may comprise an internet of things (IoT) device in which one or more of the output device 512, input device 514, and control device 516 are omitted. Or, in such an embodiment, the input device 514 may comprise one or more cameras, motion detectors, thermometers, microphones, seismic detectors, other sensors or detectors, measurement devices or encoders and the output device 512 may comprise a special-purpose display such as a single-line LED or LCD display, one or more indicators, a display panel, a meter, a valve, a solenoid, an actuator or a servo.

When computer system 500 is a mobile computing device, input device 514 may comprise a global positioning system (GPS) receiver coupled to a GPS module that is capable of triangulating to a plurality of GPS satellites, determining and generating geo-location or position data such as latitude-longitude values for a geophysical location of the computer system 500. Output device 512 may include hardware, software, firmware and interfaces for generating position reporting packets, notifications, pulse or heartbeat signals, or other recurring data transmissions that specify a position of the computer system 500, alone or in combination with other application-specific data, directed toward host 524 or server 530.

Computer system 500 may implement the techniques described herein using customized hard-wired logic, at least one ASIC or FPGA, firmware and/or program instructions or logic which when loaded and used or executed in combination with the computer system causes or programs the computer system to operate as a special-purpose machine. According to one embodiment, the techniques herein are performed by computer system 500 in response to processor 504 executing at least one sequence of at least one instruction contained in main memory 506. Such instructions may be read into main memory 506 from another storage medium, such as storage 510. Execution of the sequences of instructions contained in main memory 506 causes processor 504 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage 510. Volatile media includes dynamic memory, such as memory 506. Common forms of storage media include, for example, a hard disk, solid state drive, flash drive, magnetic data storage medium, any optical or physical data storage medium, memory chip, or the like.

Storage media is distinct from but may be used in conjunction with transmission media. Transmission media participates in transferring information between storage media. For example, transmission media includes coaxial cables, copper wire and fiber optics, including the wires that comprise a bus of I/O subsystem 502. Transmission media can also take the form of acoustic or light waves, such as those generated during radio-wave and infra-red data communications.

Various forms of media may be involved in carrying at least one sequence of at least one instruction to processor 504 for execution. For example, the instructions may initially be carried on a magnetic disk or solid-state drive of a remote computer. The remote computer can load the instructions into its dynamic memory and send the instructions over a communication link such as a fiber optic or coaxial cable or telephone line using a modem. A modem or router local to computer system 500 can receive the data on the communication link and convert the data to a format that can be read by computer system 500. For instance, a receiver such as a radio frequency antenna or an infrared detector can receive the data carried in a wireless or optical signal and appropriate circuitry can provide the data to I/O subsystem 502 such as place the data on a bus. I/O subsystem 502 carries the data to memory 506, from which processor 504 retrieves and executes the instructions. The instructions received by memory 506 may optionally be stored on storage 510 either before or after execution by processor 504.

Computer system 500 also includes a communication interface 518 coupled to bus 502. Communication interface 518 provides a two-way data communication coupling to network link(s) 520 that are directly or indirectly connected to at least one communication networks, such as a network 522 or a public or private cloud on the Internet. For example, communication interface 518 may be an Ethernet networking interface, integrated-services digital network (ISDN) card, cable modem, satellite modem, or a modem to provide a data communication connection to a corresponding type of communications line, for example an Ethernet cable or a metal cable of any kind or a fiber-optic line or a telephone line. Network 522 broadly represents a local area network (LAN), wide-area network (WAN), campus network, internetwork or any combination thereof. Communication interface 518 may comprise a LAN card to provide a data communication connection to a compatible LAN, or a cellular radiotelephone interface that is wired to send or receive cellular data according to cellular radiotelephone wireless networking standards, or a satellite radio interface that is wired to send or receive digital data according to satellite wireless networking standards. In any such implementation, communication interface 518 sends and receives electrical, electromagnetic or optical signals over signal paths that carry digital data streams representing various types of information.

Network link 520 typically provides electrical, electromagnetic, or optical data communication directly or through at least one network to other data devices, using, for example, satellite, cellular, Wi-Fi, or BLUETOOTH technology. For example, network link 520 may provide a connection through a network 522 to a host computer 524.

Furthermore, network link 520 may provide a connection through network 522 or to other computing devices via internetworking devices and/or computers that are operated by an Internet Service Provider (ISP) 526. ISP 526 provides data communication services through a world-wide packet data communication network represented as internet 528. A server computer 530 may be coupled to internet 528. Server 530 broadly represents any computer, data center, virtual machine or virtual computing instance with or without a hypervisor, or computer executing a containerized program system such as DOCKER or KUBERNETES. Server 530 may represent an electronic digital service that is implemented using more than one computer or instance and that is accessed and used by transmitting web services requests, uniform resource locator (URL) strings with parameters in HTTP payloads, API calls, app services calls, or other service calls. Computer system 500 and server 530 may form elements of a distributed computing system that includes other computers, a processing cluster, server farm or other organization of computers that cooperate to perform tasks or execute applications or services. Server 530 may comprise one or more sets of instructions that are organized as modules, methods, objects, functions, routines, or calls. The instructions may be organized as one or more computer programs, operating system services, or application programs including mobile apps. The instructions may comprise an operating system and/or system software; one or more libraries to support multimedia, programming or other functions; data protocol instructions or stacks to implement TCP/IP, HTTP or other communication protocols; file format processing instructions to parse or render files coded using HTML, XML, JPEG, MPEG or PNG; user interface instructions to render or interpret commands for a graphical user interface (GUI), command-line interface or text user interface; application software such as an office suite, internet access applications, design and manufacturing applications, graphics applications, audio applications, software engineering applications, educational applications, games or miscellaneous applications. Server 530 may comprise a web application server that hosts a presentation layer, application layer and data storage layer such as a relational database system using structured query language (SQL) or no SQL, an object store, a graph database, a flat file system or other data storage.

Computer system 500 can send messages and receive data and instructions, including program code, through the network(s), network link 520 and communication interface 518. In the Internet example, a server 530 might transmit a requested code for an application program through Internet 528, ISP 526, local network 522 and communication interface 518. The received code may be executed by processor 504 as it is received, and/or stored in storage 510, or other non-volatile storage for later execution.

The execution of instructions as described in this section may implement a process in the form of an instance of a computer program that is being executed, and consisting of program code and its current activity. Depending on the operating system (OS), a process may be made up of multiple threads of execution that execute instructions concurrently. In this context, a computer program is a passive collection of instructions, while a process may be the actual execution of those instructions. Several processes may be associated with the same program; for example, opening up several instances of the same program often means more than one process is being executed. Multitasking may be implemented to allow multiple processes to share processor 504. While each processor 504 or core of the processor executes a single task at a time, computer system 500 may be programmed to implement multitasking to allow each processor to switch between tasks that are being executed without having to wait for each task to finish. In an embodiment, switches may be performed when tasks perform input/output operations, when a task indicates that it can be switched, or on hardware interrupts. Time-sharing may be implemented to allow fast response for interactive user applications by rapidly performing context switches to provide the appearance of concurrent execution of multiple processes simultaneously. In an embodiment, for security and reliability, an operating system may prevent direct communication between independent processes, providing strictly mediated and controlled inter-process communication functionality.

The term "cloud computing" is generally used herein to describe a computing model which enables on-demand access to a shared pool of computing resources, such as computer networks, servers, software applications, and services, and which allows for rapid provisioning and release of resources with minimal management effort or service provider interaction.

A cloud computing environment (sometimes referred to as a cloud environment, or a cloud) can be implemented in a variety of different ways to best suit different requirements. For example, in a public cloud environment, the underlying computing infrastructure is owned by an organization that makes its cloud services available to other organizations or to the general public. In contrast, a private cloud environment is generally intended solely for use by, or within, a single organization. A community cloud is intended to be shared by several organizations within a community; while a hybrid cloud comprises two or more types of cloud (e.g., private, community, or public) that are bound together by data and application portability.

Generally, a cloud computing model enables some of those responsibilities which previously may have been provided by an organization's own information technology department, to instead be delivered as service layers within a cloud environment, for use by consumers (either within or external to the organization, according to the cloud's public/private nature). Depending on the particular implementation, the precise definition of components or features provided by or within each cloud service layer can vary, but common examples include: Software as a Service (SaaS), in which consumers use software applications that are running upon a cloud infrastructure, while a SaaS provider manages or controls the underlying cloud infrastructure and applications. Platform as a Service (PaaS), in which consumers can use software programming languages and development tools supported by a PaaS provider to develop, deploy, and otherwise control their own applications, while the PaaS provider manages or controls other aspects of the cloud environment (i.e., everything below the run-time execution environment). Infrastructure as a Service (IaaS), in which consumers can deploy and run arbitrary software applications, and/or provision processing, storage, networks, and other fundamental computing resources, while an IaaS provider manages or controls the underlying physical cloud infrastructure (i.e., everything below the operating system layer). Database as a Service (DBaaS) in which consumers use a database server or Database Management System that is running upon a cloud infrastructure, while a DBaaS provider manages or controls the underlying cloud infrastructure, applications, and servers, including one or more database servers.

6. Other Aspects of Disclosure

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

As used herein the terms "include" and "comprise" (and variations of those terms, such as "including", "includes", "comprising", "comprises", "comprised" and the like) are intended to be inclusive and are not intended to exclude further features, components, integers or steps.

Various operations have been described using flowcharts. In certain cases, the functionality/processing of a given flowchart step may be performed in different ways to that described and/or by different systems or system modules. Furthermore, in some cases a given operation depicted by a flowchart may be divided into multiple operations and/or multiple flowchart operations may be combined into a single operation. Furthermore, in certain cases the order of operations as depicted in a flowchart and described may be able to be changed without departing from the scope of the present disclosure.

It will be understood that the embodiments disclosed and defined in this specification extends to all alternative combinations of two or more of the individual features mentioned or evident from the text or drawings. All of these different combinations constitute various alternative aspects of the embodiments.

What is claimed is:

1. A computer-implemented method for determining whether user credentials associated with particular user identity information have been compromised without passing sensitive information between a server-side and a client side, the method comprising:
using a first computer, storing at the server-side, in one or more digital data repositories, a plurality of user identity records relating to user identity information and user passwords collected from a plurality of sources, the plurality of user identity records comprising unhashed user identity records and hashed user identity records, each of the hashed user identity records corresponding to one of the unhashed user identity records;
receiving at the server-side, via digital transmission a request from a client computing device at the client side, the request specifying a partial hash of the particular user identity information;
in response to receiving the request, the first computer at the server-side, performing on-the-fly generation of a bloom filter based on the partial hash contained in the request by:
at the server-side, generating and submitting a query to the one or more digital data repositories based on the partial hash, wherein the query is a request to determine a match of the partial hash to a portion of hashed user identity records stored at the server-side;
at the server-side, responding to the query by retrieving a result set comprising a set of unhashed user identity records, of the plurality of user identity records, that are associated with hashed user identity information that has a portion that matches the partial hash, the set of unhashed user identity records comprising a plurality of user passwords; and
at the server-side, based on the result set, generating and storing in computer memory the bloom filter, the bloom filter being configured to allow the client computing device to determine whether a particular user password that is associated with the particular user identity information is included in the plurality of user passwords represented by the bloom filter;
transmitting the bloom filter from the server-side to the client computing device at the client side; and
in response to the client computing device determining that the particular user password is included in the bloom filter, the client computing device causing execution of programmatic instructions that cause one or more remedial actions.

2. The method of claim 1, wherein the particular user identity information comprises at least one of: a username and email address.

3. The method of claim 1, wherein the partial hash comprises a subset of characters of a full hash of the particular user identity information.

4. The method of claim 1, wherein the partial hash is generated using a SHA-256 hash function.

5. The method of claim 1, further comprising:
transmitting bloom filter configuration information to the client computing device, the bloom filter configuration information comprising one or more hash functions that are used to generate the bloom filter.

6. The method of claim 1, wherein the one or more remedial actions includes one or more of: a restriction of an account associated with the particular user identity information, a locking of an account associated with the particular user identity information, a generation of an alert that indicates that the particular user identity information has been compromised, a generation of a prompt or recommendation for an account associated with the particular user identity information to change password, an automatic changing of a password of an account that is associated with the particular user identity information.

7. One or more non-transitory computer readable media storing one or more sequences of instructions which, when executed by one or more processors, cause:
using a first computer, storing, in one or more digital data repositories, a plurality of user identity records relating to user identity information and user credentials collected from a plurality of sources, the plurality of user identity records comprising unhashed user identity records and hashed user identity records, each of the hashed user identity records corresponding to one of the unhashed user identity records;
receiving via digital transmission a request from a client computing device, the request specifying a partial hash of particular user identity information;
in response to receiving the request, the first computer, performing on-the-fly generation of a bloom filter based on the partial hash contained in the request by:
generating and submitting a query to the one or more digital data repositories based on the partial hash, wherein the query is a request to determine a match of the partial hash to a portion of hashed user identity records stored in the one or more digital data repositories;

responding to the query by retrieving a result set comprising a set of unhashed user identity records, of the plurality of user identity records, that are associated with hashed user identity information that has a portion that matches the partial hash, the set of unhashed user identity records comprising a plurality of user passwords; and based on the result set, generating and storing in computer memory the bloom filter, the bloom filter being configured to allow the client computing device to determine whether a particular user password that is associated with the particular user identity information is included in the plurality of user passwords represented by the bloom filter;

transmitting the bloom filter to the client computing device; and in response to the client computing device determining that the particular user password is included in the bloom filter, the client computing device causing execution of programmatic instructions that cause one or more remedial actions.

8. The one or more non-transitory computer readable media of claim 7, wherein the particular user identity information comprises at least one of: a username and email address.

9. The one or more non-transitory computer readable media of claim 7, wherein the partial hash comprises a subset of characters of a full hash of the particular user identity information.

10. The one or more non-transitory computer readable media of claim 7, wherein the partial hash is generated using a SHA-256 hash function.

11. The one or more non-transitory computer readable media of claim 7, the one or more sequences of instructions including instructions that, when executed by the one or more processors, cause:

transmitting bloom filter configuration information to the client computing device, the bloom filter configuration information comprising one or more hash functions that are used to generate the bloom filter.

12. The one or more non-transitory computer readable media of claim 7, wherein the one or more remedial actions includes one or more of: a restriction of an account associated with the particular user identity information, a locking of an account associated with the particular user identity information, a generation of an alert that indicates that the particular user identity information has been compromised, a generation of a prompt or recommendation for an account associated with the particular user identity information to change password, an automatic changing of a password of an account that is associated with the particular user identity information.

13. A computer system comprising:
one or more processors; and
one or more memories storing instructions which, when executed by the one or more processors, cause the one or more processors to perform:

storing, in one or more digital data repositories, a plurality of user identity records relating to user identity information and user credentials collected from a plurality of sources, the plurality of user identity records comprising unhashed user identity records and hashed user identity records, each of the hashed user identity records corresponding to one of the unhashed user identity records;

receiving via digital transmission a request from a client computing device, the request specifying a partial hash of particular user identity information;

in response to receiving the request, performing on-the-fly generation of a bloom filter based on the partial hash contained in the request by:

generating and submitting a query to the one or more digital data repositories based on the partial hash, wherein the query is a request to determine a match of the partial hash to a portion of hashed user identity records stored in the one or more digital data repositories;

responding to the query by retrieving a result set comprising a set of unhashed user identity records, of the plurality of user identity records, that are associated with hashed user identity information that has a portion that matches the partial hash, the set of unhashed user identity records comprising a plurality of user passwords; and based on the result set, generating and storing in computer memory the bloom filter the bloom filter being configured to allow the client computing device to determine whether a particular user password that is associated with the particular user identity information is included in the plurality of user passwords represented by the bloom filter;

transmitting the bloom filter to the client computing device; and in response to the client computing device determining that the particular user password is included in the bloom filter, the client computing device causing execution of programmatic instructions that cause one or more remedial actions.

14. The system of claim 13, wherein the partial hash comprises a subset of characters of a full hash of the particular user identity information.

15. The system of claim 13, further comprising:
transmitting bloom filter configuration information to the client computing device, the bloom filter configuration information comprising one or more hash functions that are used to generate the bloom filter.

16. The system of claim 13, wherein the one or more remedial actions includes one or more of: a restriction of an account associated with the particular user identity information, a locking of an account associated with the particular user identity information, a generation of an alert that indicates that the particular user identity information has been compromised, a generation of a prompt or recommendation for an account associated with the particular user identity information to change password, an automatic changing of a password of an account that is associated with the particular user identity information.

* * * * *